United States Patent
Stevens et al.

(10) Patent No.: US 9,794,154 B2
(45) Date of Patent: *Oct. 17, 2017

(54) SELECTIVE IP ADDRESS ALLOCATION FOR PROBES THAT DO NOT HAVE ASSIGNED IP ADDRESSES

(71) Applicant: Viavi Solutions Inc., Milpitas, CA (US)

(72) Inventors: Michael Stevens, Fountain, CO (US); Samuel M. Bauer, Colorado Springs, CO (US); Paul Kingsley, Monument, CO (US)

(73) Assignee: Viavi Solutions Inc., Milpitas, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/852,076

(22) Filed: Sep. 11, 2015

(65) Prior Publication Data
US 2015/0381461 A1 Dec. 31, 2015

Related U.S. Application Data (63) Continuation of application No. 13/296,064, filed on Nov. 14, 2011, now Pat. No. 9,137,135.

(51) Int. Cl.
  *H04L 12/26* (2006.01)
  *H04L 29/12* (2006.01)
(52) U.S. Cl.
  CPC .............. *H04L 43/12* (2013.01); *H04L 61/20* (2013.01); *H04L 61/2007* (2013.01)
(58) Field of Classification Search
  CPC ...... H04L 61/20; H04L 43/12; H04L 61/2007
  See application file for complete search history.

(56) References Cited

U.S. PATENT DOCUMENTS

| | | |
|---|---|---|
| 7,035,257 B2 | 4/2006 | Vafaci |
| 7,088,727 B1 | 8/2006 | Short et al. |
| 7,382,779 B1 | 6/2008 | Lee |
| 7,925,722 B1 | 4/2011 | Reed et al. |
| 9,137,135 B2 | 9/2015 | Stevens et al. |
| 2004/0111640 A1 | 6/2004 | Baum |
| 2006/0080444 A1 | 4/2006 | Peddemors et al. |
| 2006/0256814 A1 | 11/2006 | Caci |
| 2007/0147258 A1 | 6/2007 | Mottishaw et al. |
| 2007/0199061 A1 | 8/2007 | Byres et al. |
| 2008/0052758 A1 | 2/2008 | Byrnes |

(Continued)

OTHER PUBLICATIONS

PCT/US2012/64857, "International Search Report", Feb. 1, 2013.
Extended European Search report corresponding to EP 12 848 828, mailed May 4, 2017, 8 pages.

*Primary Examiner* — Abdulkader M Alriyashi
(74) *Attorney, Agent, or Firm* — Harrity & Harrity, LLP (57) ABSTRACT

Systems and methods for managing communication in an IP network between a server and a probe that does not maintain an IP address by selectively restricting which IP addresses that are identified as active in the network may be borrowed for the probes. Restriction of IP addresses may include a black list to exclude specific IP addresses, a white list from which IP addresses can be drawn or both. This permits control over which IP addresses may be borrowed by probes, reducing false alarms, alerts or other network concerns caused by unexpected IP traffic on a particular IP address in the network.

20 Claims, 4 Drawing Sheets

(56) References Cited

U.S. PATENT DOCUMENTS

2009/0006585 A1\* 1/2009 Chen ................. H04L 29/12018
709/220
2010/0046395 A1 2/2010 Sivaramakrishna Iyer et al.

\* cited by examiner

SELECTIVE IP ADDRESS ALLOCATION FOR PROBES THAT DO NOT HAVE ASSIGNED IP ADDRESSES

This application is a continuation of U.S. patent application Ser. No. 13/296,064, filed Nov. 14, 2011 (now U.S. Pat. No. 9,137,135), the disclosure of which is incorporated herein by reference.

TECHNICAL FIELD

The present invention relates to network testing and measurement in IP addressable networks, and in particular to selectively including or excluding some of the network's IP addresses for use by probes, which otherwise do not maintain IP addresses.

BACKGROUND OF THE INVENTION

In a system of probes that are distributed throughout a network but do not have assigned IP addresses, a server controls the probes over an IP network using a protocol that rides on top of the IP layer. The system borrows (or spoofs) IP addresses of devices in the network and uses the borrowed IP addresses for communication with, and management of, the probes.

For some customers, however, there are IP addresses in their networks that should not be borrowed. For example, the presence of IP traffic on some specific IP addresses in the customer's network may falsely trigger alerts or other concerns within the network.

SUMMARY OF THE INVENTION

The present disclosure describes a system that can be configured to restrict the IP addresses that can be borrowed from the network. In this manner, a system according to the present disclosure may avoid falsely triggering alerts or other concerns associated with IP traffic on particular IP addresses in a customer's network.

An embodiment of the present disclosure provides a method for managing communication in an IP network between a server and a probe that does not maintain an IP address. The method comprises: providing a first list for storing IP addresses for borrowing by the probe; providing a second list for storing at least one of a black list of IP addresses to exclude from the first list, and a white list of all IP addresses permitted on the first list; identifying active IP addresses in the network that are downstream of the probe; in response to identifying active IP addresses, updating the first list with the identified active IP addresses in accordance with the second list; selecting an IP address from the first list; and assigning the selected IP address to the probe for communication with the server on top of the IP protocol.

A further embodiment of the present disclosure provides a system for managing communication in an IP network comprising: a probe that does not maintain an IP address in the network; and a server including: a first list for storing IP addresses for borrowing by the probe; a second list for storing at least one of a black list of IP addresses to exclude from the first list and a white list of all IP addresses permitted on the first list; and non-transitory computer executable instructions for: updating the first list in accordance with the second list when an active IP address downstream of the probe is identified, selecting an IP address from the first list; and assigning the selected IP address to the probe for communication with the server on top of the IP protocol.

Another embodiment of the present disclosure provides a method for controlling the communications in an IP network between a server and one or more probes that do not have assigned IP addresses, the method comprising: providing a communication means between the server and the probes based on a protocol that rides on top of the IP protocol using IP addresses that are borrowed from IP addresses used for communication on the network; providing the server with a control system comprising; means to monitor automatically the network in order to collect active IP addresses that are used on the network; means to form a list of active IP addresses for each, probe for use in communication between the server and the probes; means to drop an IP address from the list of active IP addresses should it become an invalid IP address for communication on the network and wherein: the control system is provided with an exclude list of IP addresses and; means to drop from any list of active IP addresses any IP address that is on the exclude list and; means to prevent adding an IP address that is on the exclude list to the list of active IP addresses for the probes.

BRIEF DESCRIPTION OF THE DRAWINGS

Embodiments of the present disclosure are described with reference to the following figures.

DETAILED DESCRIPTION

While preferred embodiments may be illustrated or described, they are not intended to limit the invention. Rather, numerous changes including alternatives, modifications and equivalents may be made as would be understood by the person skilled in the art. As always, the invention is defined by the appended claims.

Figure 1:
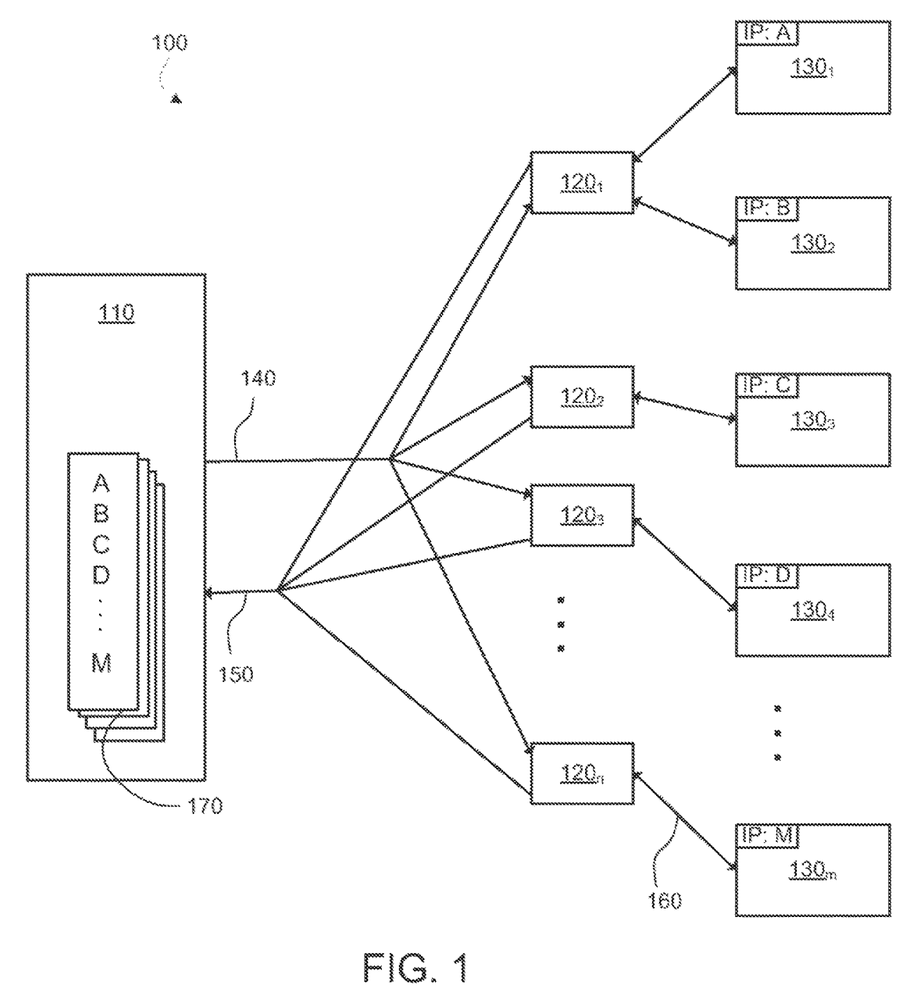
FIG. 1 is a block diagram illustrating an example network environment in which embodiments of the present disclosure may be implemented.

The system 100 illustrated in FIG. 1 is an example network environment in which an embodiment of the present disclosure could be implemented. The system 100 automatically monitors the network, from time to time collecting and recording active IP addresses. System 100 includes a server 110 for communication with probes $120_1$ to $120_n$ (collectively or individually 120) and devices $130_1$ to $130_m$ (collectively or individually 130) over an IP network (not illustrated). Commands 140 are sent on top of the IP layer from the server 110 to the probes 120, and responses 150 return from the probes 120 to the server 110. Communications 160 are also relayed, between the probes 120 and the devices 130. Communications 160 between the server 110 and devices 130 may also be relayed through the probes 120. The probes 120 do not have IP or MAC addresses and therefore are not addressable devices in the network. This permits the probes 120 to be essentially invisible to the network operator and reduces the number of addressable devices to be managed. The system 100 borrows IP and MAC addresses in the network to route packets between the server 110 to the probes 120.

The network comprises any network that supports IP communications at the network layer and includes any network elements and features found in a modern IP network. None of the nature, structure or function of the network is intended to limit the present disclosure.

The server 110 may be a packet routing engine or any other server that communicates with and manages probes 120 in an IP network. The server 110 commands and controls the probes 120. For example, the server 110 may route packets that the probes 120 send back for analysis and troubleshooting. In some embodiments, the server 110 may comprise a sealed network appliance such as a switch or router. In some embodiments, the server 110 may comprise a standard computing server that can be configured by a set of computer executable instructions stored in a non-transitory memory accessible by the standard computing server to operate an embodiment of the present disclosure. FIG. 1 illustrates a single server 110 in communication with a plurality of probes 120 and downstream devices 130; however other system configurations are also possible including a distributed server configuration. In some embodiments, multiple servers 110 are present where each probe 120 is controlled by only one server 110 at any given time. When a probe 120 is controlled by a server 110, it can be described as owned by that server 110.

The probes 120 can be any probes in an IP network. They may be configured to identify certain types of customer network packets and send them back to a central location for analysis. For example, a customer out near the edge of the network may be receiving a video stream that appears degraded while the same video stream appears fine closer to the core of the network. Using probes 120 to retrieve packets may avoid dispatching technicians to retrieve those packets. This is only one example of a function of a probe 120; the invention may manage many kinds of probes 120 including remote probes and software probes. The probes 120 may be near or far from the server 110 in the network. Each probe 120 can identify a plurality of devices 130 in the network that are downstream of the probe 120. In some embodiments, the probes 120 may communicate with the server 110 but not communicate directly with the devices 130. A probe 120 does not maintain a unique IP address within the system 100; rather, it borrows or spoofs an IP address of a device 130 that is downstream of that probe. No new IP addresses are allocated in the network when a probe 120 is assigned an IP address; rather, the probe 120 borrows an IP address of an active device 130 that has been identified in the network downstream of the probe 120. The probe 120 borrows the IP address of this downstream active device 130 for communication with the server 110 and intercepts communications from the server 110 sent to the borrowed IP address but intended for the probe 120. In this manner, the server 110 can issue a command 140 to a specific probe, e.g. $120_1$, using the IP addresses borrowed by the probe $120_1$ and the command 140 may be correctly routed to that probe $120_1$ through the IP network. The probe $120_1$ will then intercept the command 140 from the server 110 on the way to the device $130_1$, and process it. In some embodiments, the probe $120_1$ identifies which packets are commands 140 to be intercepted based on a unique pattern and/or a probe ID that is stored in the UDP payload of packet comprising the command 140.

The device 130 can be any device that has an IP address in the network. For non-limiting example, a device 130 may comprise a switch, router, server, access point, terminal, consumer computer or any other network addressable components found in an IP network. None of the nature, structure or function of devices 130 is intended to limit the present disclosure.

Commands 140 sent by the server 110 to the probes 120 and responses 150 send by the probes 120 and received by the server 110 ride on top of the IP layer. The commands 140 and responses 150 may comprise data packets or other IP network messages. In some embodiments, to initiate communication between a server 110 and a probe 120, keeping in mind that the probes 120 are not directly addressable in the network, the customer specifies the address of a device 130 that the customer knows will be on the downstream side of the probe 120 from the server 110. A probe 120, when not owned by a server 110, awaits receipt of a command 140 that comprises a discovery packet from a server 110. The server 110 sends the discovery packet ostensibly destined for a device 130 downstream of the un-owned probe 120 with the intent to take ownership of the probe 120. The probe intercepts the discover packet command 140 and sends a response 150 to the server 110 by using the source address of the command 140. After receiving the response 150, the server 110 takes ownership of the probe 120 since it then has a routable address that has been confirmed can reach the probe 120.

Although it is possible, it is not necessary for the server 110 or probes 120 to communicate directly with the devices 130. The server 110 addressed the command 140 to the device 130, but intended for the command 140 to be intercepted by the probe 120 and not be delivered to the device 130. When the probe 120 recognizes the command 140, the probe 120 will remove the command 140 from the network. In some embodiments, an initial command 140 comprising a discovery packet may also be received by the downstream destination device 130.

In some embodiments, an IP address is assigned to a probe 120 by the server 110. The server 110 sends a command 140 to the probe 120 with a destination address set to the IP address selected by the server 110 from the active IP address list 170 (described below). The probe 120 intercepts and processes the command 140, borrows the IP address for communication and sends an ACK response 150 to the server 110 with the borrowed IP address as the source address. The server 110 receives and processes the ACK response 150. Part of the ACK response 150 may include one or more new active IP addresses seen in the network by the probe 120. The server 110 records these new active IP addresses in the active IP address list 170 in association with the probe 120 that sent the ACK response 150.

Communications 160 include any communications to and from the devices 130 within the network. These communications 160 may be monitored or tracked by probes 120 for analysis or may be sent back to the server 110 for analysis. The nature, function and structure of commands 160 is not intended to limit the present disclosure.

An active IP address list 170 contains lists of active IP addresses of devices $130_1$ to $130_m$ that are downstream of each probe $120_1$ to $120_n$. IP addresses stored in these lists may be borrowed by the probe 120 for communication with the server 110 on top of the IP protocol. As illustrated in FIG. 1, devices $130_1$ (assigned IP address A) and $130_2$ (assigned IP address B) are downstream of probe $120_1$. Using communications 160, for example, probe $120_1$ may identify IP addresses A and B from devices $130_1$ and $130_2$ as active IP addresses. A subsequent response 150 from probe $120_1$ to server 110 would identity IP addresses A and B as active relative to probe $120_1$. In some embodiments, responses 150 may identify all active IP addresses or only newly active IP addresses. Upon receiving a response 150 containing these IP addresses, server 110 would update the active IP address list 170 to indicate that IP addresses A and B are active and downstream of probe $120_1$, if that information was not already present in the active IP address list 170.

As illustrated in FIG. 1, the active IP address list 170 is a single list of IP addresses in the network and that list 170 is maintained by server 110; the association of each active IP address with specific probes 120 in not illustrated. The active IP address list 170 may be divided into separate lists for each probe $120_1$ to $120_n$. The separated lists may be maintained on the server 110, maintained individually on each probe 120, or elsewhere in the system 100.

The active IP address list 170 is used to assign active IP addresses breach probe 120 for communication over the network. The active IP address list 170 is maintained in case the IP address currently borrowed for communication by a probe 120 becomes invalid in the network. If a borrowed IP address becomes invalid, a new IP address is automatically selected from the list 170. No customer interaction or configuration is necessary for the operation of system 100. An IP address may become invalid in the network for any number of reasons, for non-limiting example, a device 130 may be disconnected from the network or assigned to a different IP address, or the route between the server 110 and probe 120 may be severed and a backup route may take over that no longer routes packets through 120.

Figure 2:
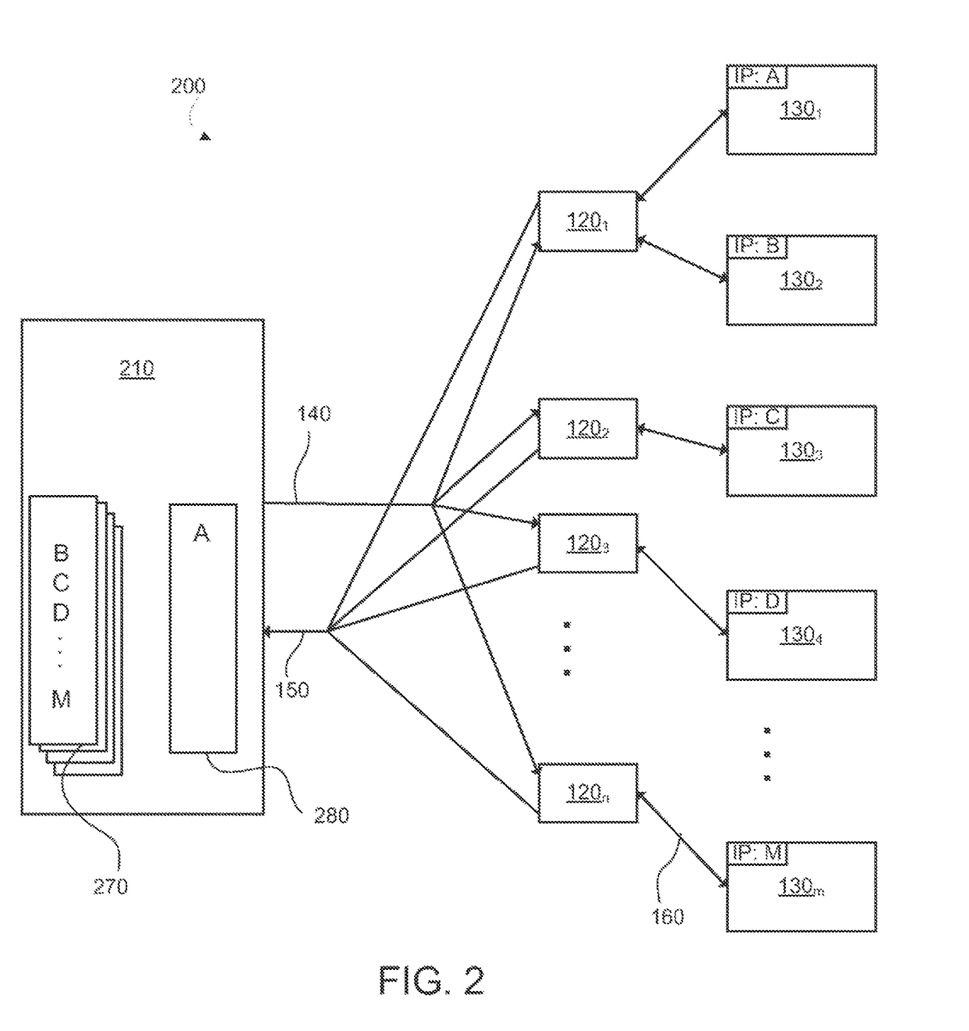
FIG. 2 is a block diagram illustrating the network environment of FIG. 1 including an embodiment of the present disclosure.

Turning now to FIG. 2, an example embodiment of the present invention is illustrated within system 200. To the extent that identical components of FIG. 1's system 100 are illustrated in system 200, description of those components will not be repeated.

In FIG. 2, a server 210 having an active IP address list 270 and a second list 280 is included in system 200. Server 210 operates similar to server 110; however, it modifies the active IP address list 270 in accordance with the second list 280 to allow the customer to restrict the IP addresses in its network that can be used by system 200. By restricting which IP addresses can be used by system 200, the customer can control which IP addresses will or will not be subject to additional IP traffic between the server 210 and the probes 120. The second list stores at least one of a black list of IP addresses to exclude from the first list and a white list of all IP addresses permitted on the first list. The customer can thus build an IP address black list and/or white list to control IP address use by the system 200. Restricting which IP addresses will carry the system's IP traffic can reduce false alarms, alerts or other network monitoring concerns caused by unexpected IP traffic on particular IP addresses. The system 200 can prevent placing additional IP traffic on a device that cannot, or was not intended to carry such a load of IP traffic. Beyond assisting the customer to avoid generating falsely suspicious IP traffic, restricting which IP addresses can be used by system 200 provides the customer with greater control over the design and use of its network which can improve the throughput and efficiency of a network employing system 200.

The active IP address list 270 is similar to active address list 170; however, active IP address list 270 is modified in accordance with the second list 280 in order to allow the customer to restrict the IP addresses in its network that can be used by system 200. Similar to the active IP address list 170, active IP address list 270 and second list 280 may be divided into separate lists for each probe $120_1$ to $120_n$ and may be maintained on the server 210, maintained individually on each probe 120, or elsewhere in the system 200. In some embodiments, where the active IP address list 270 contains no IP addresses associated with a particular probe 120, then that server 210 has no way to communicate with or control that probe 120. Presuming no other server 210 can communicate with that probe 120, communication will be lost and the probe 120 will eventually revert to an un-owned or un-managed state unless a new downstream active IP address becomes available.

The second list 280 may be an IP address exclusion list (sometimes referred to as a black list), an IP inclusion list (sometimes referred to as a white list), or the second list 280 may include both an exclusion list and an inclusion list. Where the second list 280 comprises an exclude list, IP addresses discovered by probes $120_1$ to $120_n$ will be added to the active IP address list 270 when those IP addresses are not included in the exclude list. Where the second list 280 comprises an include list, IP addresses discovered by probes $120_1$ to $120_n$ will be added to the active IP address list 270 when those IP addresses are included in the include list. Where the second list 280 comprises both an include list and an exclude list, IP addresses discovered by probes $120_1$ to $120_n$ will be added to the active IP address list 270 when those IP addresses are included in the include list but not included in the exclude list.

The second list 280 is configurable by the customer to add or remove IP addresses. The second list 280 may be accessible remotely over the network, outside of the network or directly from the server 210 or other device maintaining the second list 280. IP addresses may be added to the second list 280 individually, by a range or subset of IP addresses, by a unique device name or MAC address for example where a device 130 is provided a dynamic IP address in the network, or by various other methods used to identify device IP addresses. IP addresses added to the second, list 280 may be maintained indefinitely on the list until removed by the customer, until expiry of a fixed time or fixed time duration, or until other terminal conditions are satisfied.

As illustrated in FIG. 2, the second list 280 provides an exclusion list maintained by server 210. Devices $130_1$ to $130_m$ having IP addresses A to M have been identified by probes $120_1$ to $120_n$ as active in the network. The customer has set the exclusion list of second list 280 to include IP address A. Accordingly, the active IP address list 270 includes only IP addresses B, C, D to M. The system selects an IP address from the active IP address list 270 and assigns it to the probe. Probes $120_1$ to $120_n$ can be assigned any IP address from the active IP address list 270 that is downstream from that probe.

The system 200 identifies active IP addresses in the network that are downstream of the probe 120 and in response, updates the first list with the identified active IP addresses in accordance with the second list. When a response 150 from probe $120_1$ to server 210, such as an ACK response, includes information identifying active IP addresses A and B is received, none of the IP addresses that are also in the exclude list would be added to the active IP address list 270. When the exclude list of second list 280 is updated, the active IP list 270 is scrubbed so that none of the IP addresses in the exclude list will be allowed to remain in the active IP address list 270. Additionally, if any of the probes $120_1$ to $120_n$ are borrowing an IP address that was added to the exclude list during the update, the use of that IP address will be stopped and automatic selection of a new IP address from the active IP address list 270 will be triggered.

Referring again to FIG. 2 where the active IP address list 270 and the second list 280 are maintained by server 210, if probe $120_1$ has borrowed IP address A and the exclude list of second list 280 is subsequently updated to exclude IP address A, the server 210 removes IP address A from the active IP address list 270 and transmits a command to probe $120_1$ instructing probe $120_1$ to use IP address B. The probe $120_1$ intercepts the command 140, processes it, and updates its borrowed IP address accordingly. The probe $120_1$ may then send a response 150 such as an ACK response, to the server 210 using IP address B as the source IP address.

In some embodiments, the server 210 sends a command 140 to the probe $120_1$ that was borrowing for communication a now invalid IP address. The command 140 specifies a destination address that has been selected from the active IP address list 270, such as IP address B. The probe $120_1$ intercepts and processes the command 140, borrows the IP address for communication and sends an ACK response 150 to the server 110 with the borrowed IP address, B, as the source address. The server 110 receives and processes the ACK response 150. Part of the ACK response 150 may include one or more new active IP addresses seen in the network by the probe $120_1$. If so and these new active IP addresses are not included in the exclude list of the second list 280, the server 110 records these new active IP addresses in the active IP address list 270 in association with the probe $120_1$.

Figure 3:
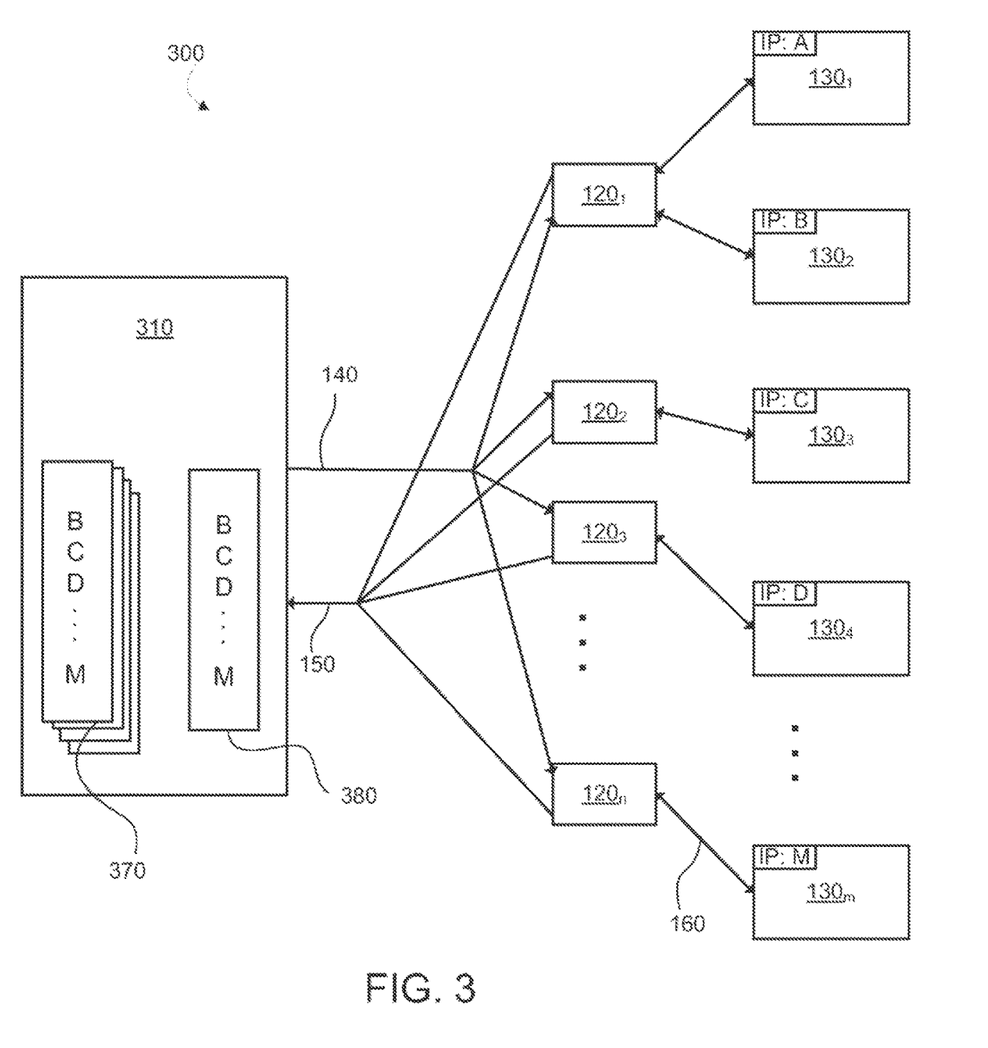
FIG. 3 is a block diagram illustrating the network environment of FIG. 1 including another embodiment of the present disclosure.

In FIG. 3, another example embodiment of the present disclosure is illustrated within system 300. To the extent that identical components of FIG. 1 and 2's systems 100, 200 are illustrated in system 300, description of those components will not be repeated.

In FIG. 3, a server 310 having an active IP address list 370 and a second list 380 is included in system 300. Server 310 operates similar to server 210. The second list 380 illustrated in FIG. 3 provides an include list or white list. The include list of the second list 380 lists IP addresses which, if found to be active in the network, can be used by system 300. In the system 300, when a response 150 from a probe $120_1$ includes information identifying active IP addresses A and B, only those IP addresses that match an IP address in the include list will be added to the active IP address list 380. When an IP address is removed from the include list, an analogous process as describe above in respect of adding a new IP address to the exclude list is executed.

Where the second list 280, 380 includes both an include list and an exclude list, newly identified active IP addresses are added to the active IP address list 280, 380 only if they are both present in the include list and not present in the exclude list.

Figure 4:
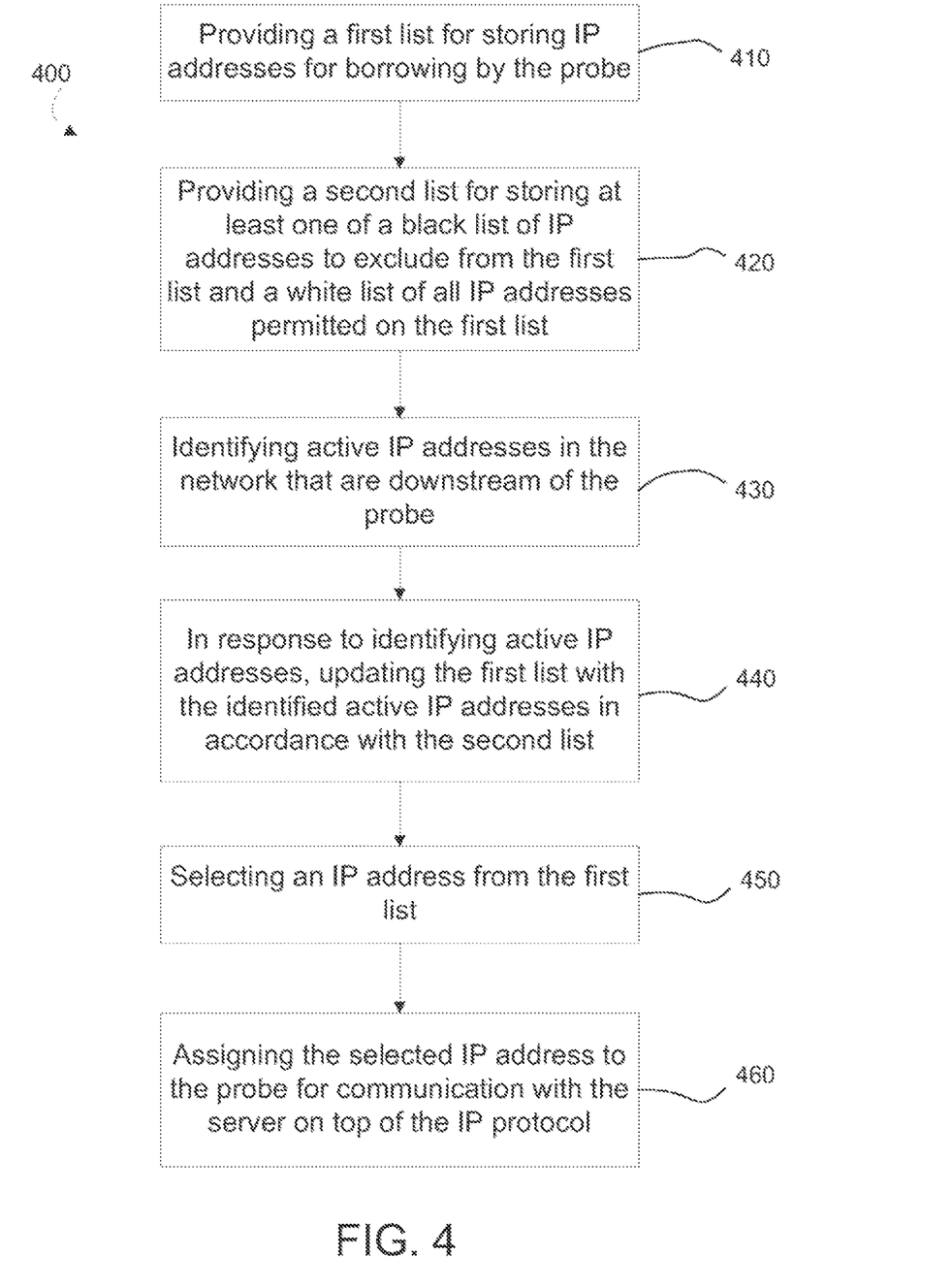
FIG. 4 is a flowchart illustrating an example process of the present disclosure.

Referring to FIG. 4, an example process 400 for managing communication in an IP network between a server and a probe that does not maintain an IP address is illustrated. Although the actions in FIG. 4 are illustrated in a sequential order, other sequences of actions are possible as understood from the present disclosure. At 410, a first list for storing IP addresses is maintained on the customer's IP network. The IP addresses in this first list may be borrowed by the probe for communication with the server on top of the IP protocol. At 420, a second list for storing IP addresses is maintained on the customer's IP network. The IP addresses in this second list restrict the IP addresses which may be added to the first list. The second list comprises at least one of a black list of IP addresses to exclude from the first list and a white list of all IP addresses permitted on the first list. The IP addresses of the black list are IP addresses which the customer has specified are not to be borrowed by a probe. The IP addresses of the white list are IP addresses which the customer has specified can be borrowed if those IP addresses are active in the network. At 430, active IP addresses that are downstream of the probe in the network are identified. Identification may be achieved directly by the server, individually by each probe in the network, or by other network monitoring devices. In response to identifying an active IP address, at 440, the first list is updated with the identified active IP addresses in accordance with the second list. If the identified active IP addresses are already present in the first list, no changes are necessary. If active IP addresses not included in the first list were identified, the second list is consulted. The mechanisms by which the second list restricts which IP addresses can be added to the first list have been described above in respect to FIGS. 2 and 3. If the second list does not restrict against adding the active IP address to the first list, the active IP address is added to the first list.

At 450 an IP address is selected from the first list for assignment to a probe. At 460, the selected IP address is assigned to the probe. For example, the server may issue a command to the probe indicating that the probe must borrow the selected IP address. In other embodiments, the probe may inform the server that it is now borrowing the selected IP address. If at any time, an IP address on the first list becomes invalid, it is removed from the first list. If that invalid IP address was being borrowed by a probe, reassignment of another IP address from the first list would be initiated. Reassignment of another IP address may also be necessary when the second list is updated such as by adding an IP address to the black list or removing an IP address from the white list.

As known to a person skilled in the art, the network, server, control system, probes, devices and other computer features described in this disclosure may be implemented in hardware, software or a combination of both. They may form part of an independent, distributed, share or other configuration of computing elements capable of storing, accessing, reading and executing transitory and/or non-transitory computer instructions.

We claim:
1. A server device comprising:
a memory configured to store instructions; and
a processor configured to execute the instructions to:
receive an Internet Protocol (IP) address associated with a network device disposed downstream of a probe for monitoring a network associated with the network device;
compare the IP address to IP addresses included in a first list;
selectively add, based on comparing the IP address to the IP addresses included in the first list, the IP address to IP addresses included in a second list, the second list being different than the first list;
select, based on selectively adding the IP address to the IP addresses included in the second list, a particular IP address from the IP addresses included in the second list; and
assign the particular IP address to the probe,
the particular IP address enabling the probe to communicate with the server device,
wherein assigning the particular IP address to the probe the processor is configured to send, to the probe, a command that includes the particular IP address as a destination IP address of the command, the destination IP address of the command to be
borrowed by the probe for communication with
the server device.
2. The server device of claim 1, where, when selectively adding the IP address to the IP addresses included in the second list, the processor is configured to:
add the IP address to the IP addresses included in the second list when the IP address is included in the first list.
3. The server device of claim 1, where the processor is further configured to:
determine that the IP address is included in the first list; and
exclude the IP address from the second list when the IP address is included in the first list.
4. The server device of claim 1, where
the first list includes an include list and an exclude list,
the IP address is added to the IP addresses included in the second list when the IP address is included in the include list, and
the IP address is excluded from the IP addresses included in the second list when the IP address is included in the exclude list.
5. The server device of claim 1, where the IP addresses included in the first list are added to the first list using at least one of:
the particular IP address,
a range of IP addresses,
a subset of IP addresses,
a name of the network device, or
a Media Access Control (MAC) address.
6. The server device of claim 1, where the IP address is received from the probe.
7. The server device of claim 6, where the probe identifies the IP address based on communicating with the network device.
8. The server device of claim 1, where the processor is further configured to:
send the command to the probe based on selecting the particular IP address from the IP addresses included in the second list;
receive, based on the probe receiving the command, a response message with the particular IP address set as a source address; and
associate, based on the response message, the particular IP address with the probe.
9. The server device of claim 1, where the processor is further configured to:
determine that the particular IP address is no longer valid;
select, based on determining that the particular IP address is no longer valid, another particular IP address from the IP addresses included in the second list; and
assign the other particular IP address to the probe.
10. The server device of claim 1, where the processor is further configured to:
store, at the server device, the first list and the second list.
11. The server device of claim 1, where the first list and the second list are stored at the probe.
12. A method comprising:
receiving, by a server device, an Internet Protocol (IP) address associated with a network device disposed downstream of a probe for monitoring a network associated with the network device;
comparing, by the server device, the IP address to IP addresses included in a first list;
selectively adding, by the server device and based on comparing the IP address to the IP addresses included in the first list, the IP address to IP addresses included in a second list,
the second list being different than the first list;
selecting, by the server device and based on selectively adding the IP address to the IP addresses included in the second list, a particular IP address from the IP addresses included in the second list; and
assigning, by the server device, the particular IP address to the probe,
the particular IP address enabling the probe to communicate with the server device,
wherein assigning the particular IP address to the probe includes sending, to the probe, a command that includes the particular IP address as a destination IP address of the command,
the destination IP address of the command to be borrowed by the probe for communication with the server device.
13. The method of claim 12, where selectively adding the IP address to the IP addresses included in the second list includes:
adding the IP address to the IP addresses included in the second list when the IP address is included in the first list.
14. The method of claim 12, further comprising:
determining that the IP address is included in the first list; and
excluding the IP address from the second list when the IP address is included in the first list.
15. The method of claim 12, where
the first list includes an include list and an exclude list,
the IP address is added to the IP addresses included in the second list when the IP address is included in the include list, and
the IP address is excluded from the IP addresses included in the second list when the IP address is included in the exclude list.
16. The method of claim 12, where the IP addresses included in the first list are added to the first list using at least one of:
the particular IP address,
a range of IP addresses,
a subset of IP addresses,
a name of the network device, or
a Media Access Control (MAC) address.
17. The method of claim 12, where the IP address is received from the probe, and the probe identifies the IP address based on communicating with the network device.
18. The method of claim 12, further comprising:
sending the command to the probe based on selecting the particular IP address from the IP addresses included in the second list;
receiving, based on the probe receiving the command, a response message with the particular IP address set as a source address; and
associating, based on the response message, the particular IP address with the probe.
19. The method of claim 12, further comprising:
determining that the particular IP address is no longer valid;
selecting, based on determining that the particular IP address is no longer valid, another particular IP address from the IP addresses included in the second list; and
assigning the other particular IP address to the probe.

20. A system comprising:
a probe for monitoring a network associated with a network device disposed downstream of the probe; and
a server device configured to:
  receive an Internet Protocol (IP) address associated with the network device;
  compare the IP address to IP addresses included in a first list;
  selectively add, based on comparing the IP address to the IP addresses included in the first list, the IP address to IP addresses included in a second list, the second list being different than the first list;
  select, based on selectively adding the IP address to the IP addresses included in the second list, a particular IP address from the IP addresses included in the second list; and
  assign the particular IP address to the probe,
    the particular IP address enabling the probe to communicate with the server device,
    wherein assigning the particular IP address to the probe, the server device is configured to send, to the probe, a command that includes the particular IP address as a destination IP address of the command,
      the destination IP address of the command to be borrowed by the probe for communication with the server device.

* * * * *